Sept. 20, 1971   J. J. SCHULLER   3,606,042
VEHICLE HOPPER DOOR OPERATING MECHANISM
Filed July 2, 1969   3 Sheets-Sheet 1
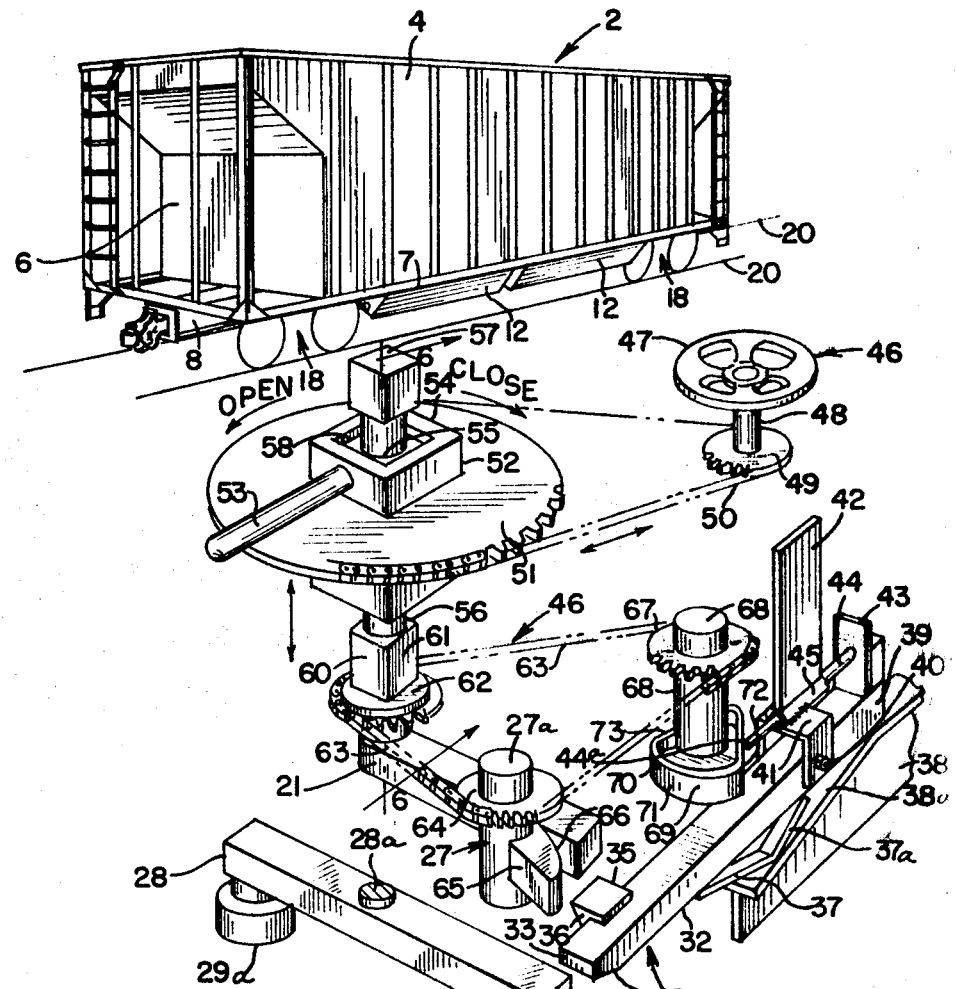
Fig. 1
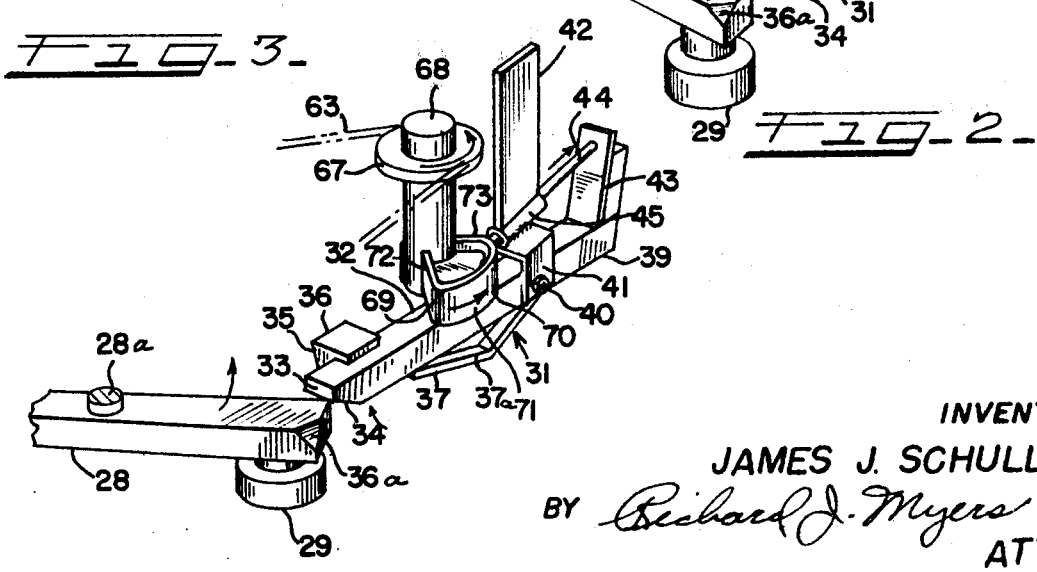
Fig. 2
Fig. 3
INVENTOR
JAMES J. SCHULLER
BY Richard J. Myers
ATT'Y.

Sept. 20, 1971  J. J. SCHULLER  3,606,042
VEHICLE HOPPER DOOR OPERATING MECHANISM
Filed July 2, 1969  3 Sheets-Sheet 2
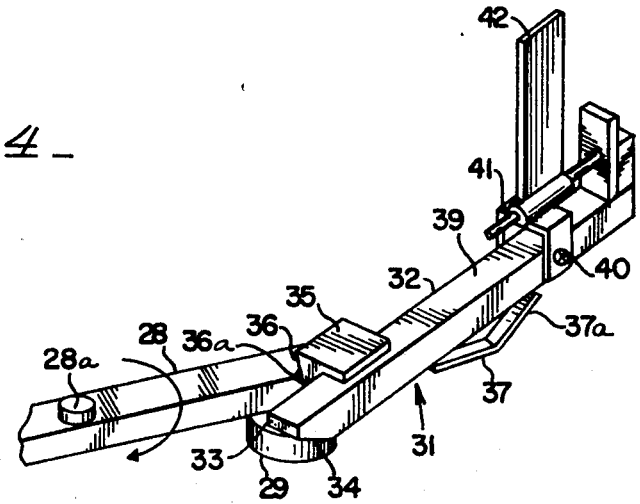
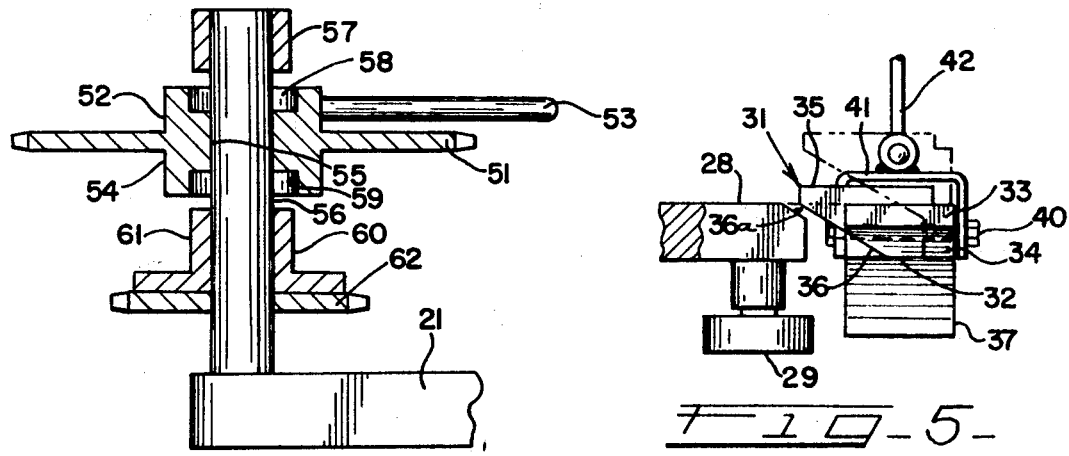
INVENTOR
JAMES J. SCHULLER
BY Richard J. Myers
ATT'Y.

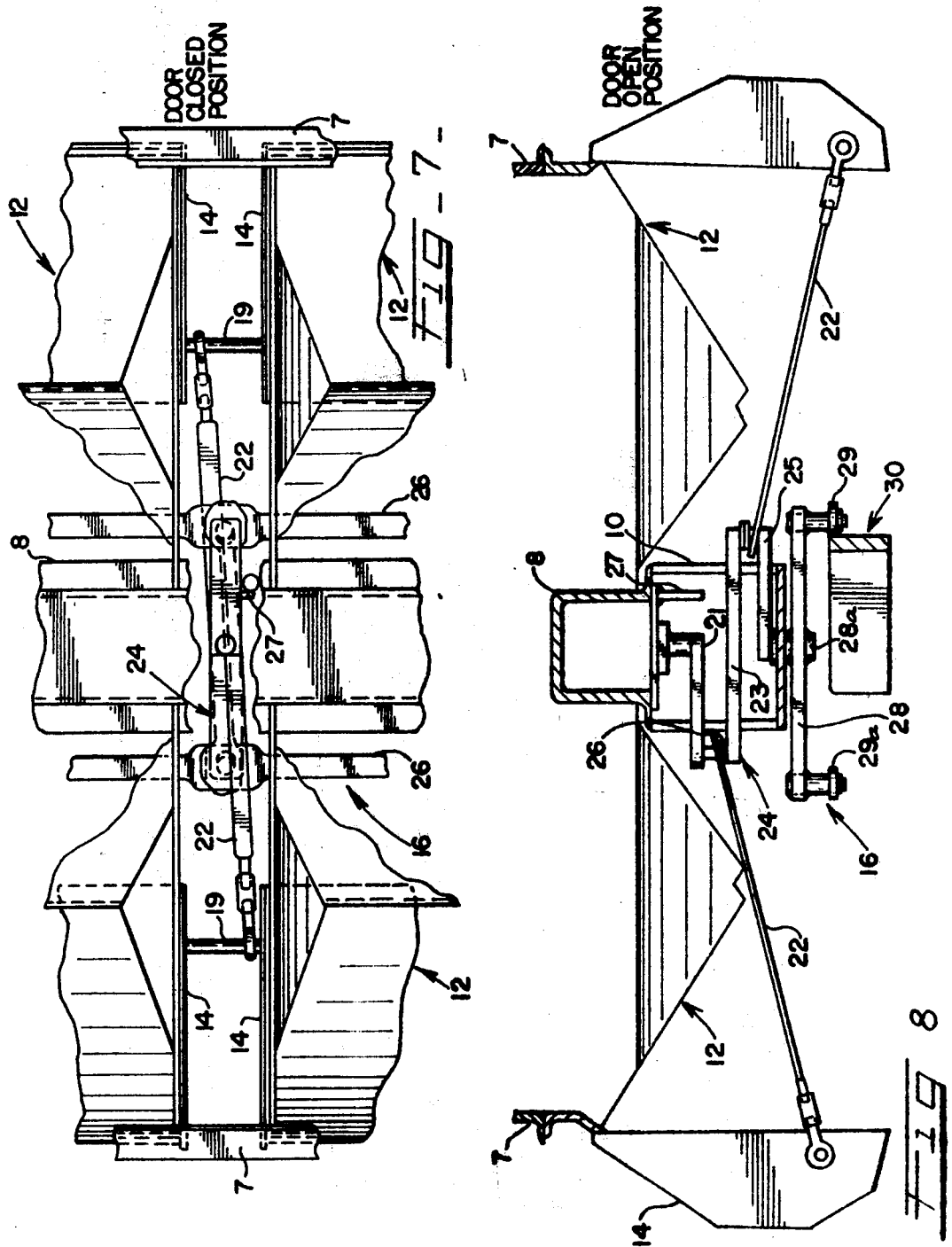

United States Patent Office 3,606,042
Patented Sept. 20, 1971

3,606,042
VEHICLE HOPPER DOOR OPERATING MECHANISM
James J. Schuller, Dolton, Ill., assignor to Pullman Incorporated, Chicago, Ill.
Filed July 2, 1969, Ser. No. 838,714
Int. Cl. B61d 7/30; B65g 67/24
U.S. Cl. 214—63    8 Claims

ABSTRACT OF THE DISCLOSURE

In a railroad hopper car, a hopper door operating mechanism including a car-mounted door opening and closing crank mechanism and a track-engaging drive lever constrained for rotation with said crank mechanism and having hopper door opened and closed positions, the crank mechanism in the closed position having its linkage disposed in over-center relation to prevent accidental opening of the car doors and an auxiliary lock bar preventing movement of the drive lever to the open position should it pass over-center toward the open position, said auxiliary lock bar including a vertically pivotal bar engageable with a portion of the crank mechanism to prevent movement of the drive lever, the end edge of the drive lever and the side edge of the auxiliary lock bar each being chamfered to permit movement of the drive lever from the open to closed position by raising of the lock bar to permit passage of the drive lever past the lock.

SUMMARY

It is a general object of this invention to provide for a railroad hopper discharge door operating mechanism for opening and closing of the hopper doors and, in particular, providing suitable locking mechanism to prevent opening of the hopper doors when the railroad car is in transit and to allow the hopper doors to be closed without the same being prevented by the lock means of the door operating mechanism. This invention relates particularly to an improvement on the hopper door operating crank mechanism as disclosed in the co-pending U.S. patent application Ser. No. 598,440 filed Dec. 1, 1966, of William R. Shaver, now U.S. Pat. No. 3,459,317 issued Aug. 5, 1969, which is hereby incorporated by reference herein, and further relates to an improved auxiliary lock bar cooperative to limit movement of the drive lever of the crank mechanism as shown in the copending U.S. patent application Ser. No. 618,152 filed Feb. 23, 1967, now U.S. Pat. No. 3,515,076 issued on June 2, 1970, of Herman A. Aquino which is hereby incorporated by reference herein.

It is a general object of this invention, therefore, to provide for a door operating mechanism which is prevented from accidentally opening and yet the means to lock the crank mechanism in the closed position is adapted to permit the doors to move from an open to a closed position.

A more specific object of this invention is to provide for a door opening and closing operating crank mechanism which is prevented from accidentally opening by an over-center stop and which has an additional auxiliary lock bar which prevents the drive lever attached to the crank mechanism from opening should the crank mechanism pass its over-center position and yet movement of the crank drive lever from the open to the closed position is permitted because of chamfer surface means on both the drive lever and the auxiliary lock bar which permits rotation of the drive lever past the lock bar and raising the latter to clear thereby. These and other objects will become apparent from reference to the following description, attached drawings and appended claims.

BRIEF DESCRIPTION OF THE DRAWINGS

FIG. 1 is a perspective view of the railroad hopper car employing the novel door operating mechanism;

FIG. 2 is a perspective view of the vehicle-mounted door operating mechanism and the ground-mounted co-operating door operating mechanism;

FIG. 3 is a view of the vehicle operating mechanism in an operating position;

FIG. 4 is another perspective view of the operation of the vehicle door operating mechanism;

FIG. 5 is a partial side elevational view of the lock mechanism for the vehicle door operating mechanism;

FIG. 6 is a cross sectional view of the clutching mechanism of the door operating mechanism;

FIG. 7 is a partial top plan view of the door operating mechanism mounted on the hopper vehicle; and FIG. 8 is a cross sectional view of the hopper vehicle and its door operating mechanism.

DESCRIPTION OF THE PREFERRED EMBODIMENT

With reference now to the drawings, there is shown a railroad hopper car 2, as seen in FIGS. 1, 7 and 8 and having sides 4 and side sills 7, and ends 6, a center sill 8 and door operating supporting structure 10 carrying door operating mechanism 16 for operating the doors 14 of the car hoppers 12. The car 2 is movably supported on the trucks 18 and rides over the car wheel-engaging rails 20. The door operating mechanism 16 is of the type disclosed in the aforesaid co-pending Shaver patent application. The door operating mechanism 16 includes door operating arms 22 connecting with the doors 14 and with the crank structure 24, as seen in FIGS. 7 and 8, having an upper crank 21, an intermediate crank 23 and a lower crank 25, the crank structure 24 being engaged with the over-center crank stop means 27 when the vehicle doors and the door operating mechanism are in the closed door position. Each crank structure 24 is connected by transfer links 26, one crank structure 24 fixedly supporting a drive lever 28 having cam follower rollers 29 and 29a and connected by shaft 28a to lower crank arm 25. The cam follower roller 29 of the drive lever 28 is positioned underneath the car and adapted for engagement with the drive lever engaging cam track means 30, as seen in FIG. 8. The further particulars of the door operating mechanism 16 and the drive lever engaging cam track means 30 are shown in the aforesaid U.S. patent application of Shaver. The cam track means 30 cooperates with the door operating mechanism 16 to open and close the hopper doors 14 as the car passes by the cam track means 30.

The door operating mechanism in the closed door position is in an over-center position so that the upper crank 21 is against the stop means 27, as seen in FIG. 7, and when the crank arm 21 rotates 180° away from the stop means 27, the operating mechanism is in the door open position as seen in FIG. 8. Additional or auxiliary lock means 31, as shown in FIGS. 2 through 5, and as disclosed in the aforesaid co-pending patent application of Aquino, prevents movement of the crank structure 24 of the door operating mechanism 16 when the door operating mechanism is in the closed door over-center position because should the door operating mechanism somehow go past the over-center position away from the stop means 27, the drive lever 28 would have its end carrying roller means 29 butt against the auxiliary lock means 31 when the latter is down in the operative or locking position. The auxiliary lock bar means 31 is pivotal between down or horizontal locking or operative position and raised or unlocked or door mechanism releasing position and comprises a pivotal elongated lock bar 32 having a free end 33 for engagement or abutment with the end of the drive lever 28 to prevent its movement. The free end of the lock bar is provided with a chamfer surface or edge 34 which allows for the drive lever end carrying roller 29 to more quickly or to sooner clear the lock bar when it is being raised by the lock bar raising cam track 38 which is ground-mounted. Adjacent the free end 33 of the lock bar 32 is mounted thereon the drive lever clearance member 35 which has a chamfer edge or surface 36 cooperative with the chamfer or edge 36a of the end of the drive lever 28 to permit clearance of the drive lever past the auxiliary lock bar 32 when the drive lever and its attendant crank mechanism are rotating from the door opened position to the door closed position where the crank mechanism had previously been placed in the door opened position by the automatic or drive lever engaging ground-mounted cam track means 30 and is being closed by the manual drive means 46 (see FIG. 2). This condition is shown by FIGS. 4 and 5. The lock bar 32 is provided on its underside or undersurface with a ground-mounted cam track engaging cam member 37 having a V-shaped or sloped surface 37a which is engageable with the upwardly sloping surface 38a of a ground-mounted lock bar raising cam track 38 to pivot the lock bar from the down or operating position to the raised or inoperative position permitting unobstructed movement of the drive lever 28. Thus, the cam track 38 cooperates with the cam track means 30 to raise the lock bar to the out-of-way position whereby the cam track means 30 then can rotate the crank mechanism 24 for automatic opening of the doors 14. The pivot end 39 of the lock bar 32 is provided with pivot means 40 carried on bracket 41 mounted on car-mounted support 42 to allow vertical swinging movement of the lock bar 32 between operative and inoperative positions.

In addition to the crank structure 24 and the lock bar 32 being operated by ground-mounted cam track means 30 and 38, both the crank mechanism and the auxiliary lock bar may be operated manually by the manual drive means 46 as disclosed in the aforesaid co-pending application of Aquino. To this end, the lock bar is provided with an upright back support 43 at its pivotal end, and a horizontally extending floating push rod 44 has one end slidably abuttable with support 43 and has end 44a slidable through a push rod tube 45 carried by car support 42. The push rod and 44a is engageable with the car-mounted cam member 69 which is operated by the car-mounted hand operated wheel 47 of the manual drive means 46. The transmission of power is from the wheel 47 to shaft 48, sprocket 49, sprocket chain 50, and clutch sprocket 51 to clutch unit 52 which, when in the manual opening drive position, drives lower sprocket 62, see FIG. 2, which in turn drives chain 63 and ultimately the cam member 69, as well as driving the stop means 27, see FIGS. 2 and 3, which operation will be further explained below.

The operation of the clutch unit 52 is as follows. The clutch unit 52 is provided with a clutch shifter arm 53 for raising and lowering the clutch 52 mounted on the clutch housing 54 having a housing bore 55 which is vertically reciprocal on crank arm drive shaft 56 fixedly attached to the crank arm 21. The crank arm drive shaft 56 has fixedly attached thereto at its upper end rectangular block or crank arm drive shaft clutch member 57. The housing 54 is provided with an upper rectangular slot or bore communicative with the housing bore 55 and couplable with the clutch member 57 for driving the upper crank arm 21. The housing 54 is also provided with a lower rectangular slot or bore communicative with the bore 55 which is slidably received about rectangular outer peripheral surface 61 of the rectangular rotatable sleeve 60 for lock bar and over-center stop manual drive. The sprocket 62 is fixedly attached to the sleeve 60 and drive chain 63 in either direction depending on rotation of the wheel 47 to rotate stop sprocket 64 for rotation of stop finger or cam 65 fixedly mounted on stop shaft 27a, the stop cam 65 having a stop cam surface 66 engageable with the outer end of the crank arm 21 for movement of the latter. When the chain 63 is rotating, it engages the lock bar drive sprocket 67 which in turn also rotates shaft 68 with shaft 27a to rotate the cam member 69 having cam surface means 70 including an arcuate cam surface portion 71 and side sloped surface portions 72 and 73, surface 72 engaging the plunger or push rod 44, FIGS. 2 and 3 illustrating two pivotal positions of the auxiliary lock bar due to operation of the manual drive means. Thus, when the hand wheel 47 of the manual drive means 46, as viewed in FIG. 2, is rotated counterclockwise, the lock bar is manually lifted to the inoperative position and the stop cam 65 pushes the crank arm 21 over-center to open the doors for manual discharge of the contents of the hopper when the clutch unit is shifted to the down position, see FIG. 6, where the clutch bore 59 engages the peripheral surface 61 of the sleeve 60. To manually close the hopper doors, the shifter arm 53 permits manual raising of the clutch unit 52 for engagement between clutch portions 58 and 57 to manually drive the crank arm 21 by rotation of the hand wheel 47 clockwise which causes crank arm 21 to push against the stop cam 65 to rotate the sprocket chain 63 and operate cam member 69 to lower the auxiliary lock bar to the down or crank mechanism blocking or operative position to prevent rotation of the crank mechanism whilst rotation of the crank arm 21 in clockwise direction moves the door operating mechanism and the doors thereby to the door closed position.

The co-active camming surfaces 36 and 36a of the lock bar and drive lever respectively permit passage of the drive lever from the open to closed door positions should the auxiliary lock bar be in the down or operative position and the cam 69 is not rotating or is not being used on the particular car employing the manual drive shaft 68 and cam 69. The lower free end tapered edge or surface 34 of the auxiliary lock bar insures early clearance of the lock bar out of the path of the drive lever whether manual or automatic operation of the door operating mechanism is employed.

The foregoing description and drawing are given merely to explain and illustrate the invention and the invention is not to be limited thereto since those skilled in the art who have the disclosure before them will be able to make modifications and variations therein without departing from the scope of the invention.

What is claimed is:

1. In a railroad hopper car, a door operating mechanism including a vertically mounted crank mechanism including a drive lever constrained for rotation therewith about a vertical axis, the drive lever being swingable from an over-center locking closed position to an open position, a car-mounted auxiliary lock bar vertically swingable about a horizontal axis from an upper out-of-use position to a lower position in moving obstructing relationship with respect to said drive lever and said drive lever having a tapered upper surface and said auxiliary lock bar having a lower side tapered surface slidably engageable by said drive lever and the crank mechanism passing from the door open to the door closed position whereby said lock bar is pivoted up and out of the way of the path of movement of the drive lever to the closed position.

2. The invention according to claim 1, and said auxiliary lock bar having a free end with a lower end tapered surface permitting early clearance of the drive lever past the free end of the lock bar when the lock bar is swung upwardly to an out-of-use position for the passage of the crank mechanism from the door closed to the door open position.

3. In a railroad hopper car, a door operating mechanism including a crank mechanism having a drive lever constrained for rotation therewith, the drive lever being swingable from a door closed position to a door open position, lock means being pivotally mounted on the car adjacent the drive lever and being pivotal from an out-of-use position to an operative position, said lock means being obstructively in the path of movement of the drive lever in said operative position, and said drive lever having surface means and said lock means having surface means in the operative position thereof engaging the surface means of said drive lever as the drive lever passes from the door open the door closed position with said lock means bing pivoted thereby out of the way of the path of movement of the drive lever toward the out-of-use position.

4. The invention according to claim 3, and said crank mechanism being vertically mounted and depending from the underside of said hopper car, said drive lever being constrained for rotation with and depending from said crank mechanism.

5. The invention according to claim 3, and said crank mechanism being vertically mounted and depending from the underside of said hopper car, said drive lever being constrained for rotation with and depending from said crank mechanism, said lock means including a bar that is vertically swingable about a horizontal axis of the car from the upper out-of-use position to the lower operative position.

6. The invention according to claim 3, and said lock means including a bar that is vertically swingable about a horizontal axis of the car from the upper out-of-use position to the lower operative position.

7. In a railroad hopper car, a door operating mechanism having a drive lever constrained for rotation therewith, the drive lever being swingable from an over-center locking closed position to an open position, a car-mounted auxiliary lock means pivotal from an out-of-use position to an operative position in moving obstructing relationship with respect to said drive lever and said drive lever having surface means and said auxiliary lock means having surface means engageable by said drive lever and the crank mechanism passing from the door open to the door closed position whereby said lock means is pivoted out of the way of the path of movement of the drive lever to the closed position, and the surface means of said drive lever including an upper tapered surface at the free end of the drive lever and the surface means of the auxiliary lock means including a lower side tapered surface.

8. The invention according to claim 3, and said lock means having a free end with a lower end tapered surface permitting early clearance of the drive lever past the free end of the lock means when the lock means is swung upwardly to an out-of-use position for the passage of the crank mechanism from the door open to the door closed position.

References Cited

UNITED STATES PATENTS 3,515,076   6/1970   Aquino _____ 214—3X

ROBERT G. SHERIDAN, Primary Examiner

U.S. Cl. X.R.

105—241C, 313